US012651938B2

(12) United States Patent (10) Patent No.: US 12,651,938 B2
Hamada et al. (45) Date of Patent: Jun. 9, 2026

(54) SYNCHRONOUS RELUCTANCE MOTOR

(71) Applicant: Mitsubishi Electric Corporation, Tokyo (JP)

(72) Inventors: Yu Hamada, Tokyo (JP); Moriyuki Hazeyama, Tokyo (JP); Hiroshi Mitsuda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 187 days.

(21) Appl. No.: 18/261,532

(22) PCT Filed: Mar. 24, 2021

(86) PCT No.: PCT/JP2021/012387
§ 371 (c)(1),
(2) Date: Jul. 14, 2023

(87) PCT Pub. No.: WO2022/201396
PCT Pub. Date: Sep. 29, 2022

(65) Prior Publication Data
US 2024/0072594 A1 Feb. 29, 2024

(51) Int. Cl.
*H02K 3/493* (2006.01)
*H02K 19/02* (2006.01)
(52) U.S. Cl.
CPC ............. *H02K 3/493* (2013.01); *H02K 19/02* (2013.01)
(58) Field of Classification Search
CPC ...... H02K 19/02; H02K 19/103; H02K 3/493; Y02T 10/64
See application file for complete search history.

(56) References Cited

U.S. PATENT DOCUMENTS

| | | | |
|---|---|---|---|
| 4,425,521 A | 1/1984 | Rosenberry et al. | |
| 4,539,499 A * | 9/1985 | Punch ................... | G01R 31/34 |
| | | | 310/214 |
| 5,258,681 A | 11/1993 | Hibino et al. | |
| 5,877,572 A * | 3/1999 | Michaels ............... | H02K 1/146 |
| | | | 310/179 |
| 2013/0307450 A1* | 11/2013 | Fuller ................... | B60L 15/20 |
| | | | 318/400.3 |

FOREIGN PATENT DOCUMENTS

| | | |
|---|---|---|
| JP | S6387146 A | 4/1988 |
| JP | 01034147 A | 2/1989 |
| JP | H0522885 A | 1/1993 |

(Continued)

OTHER PUBLICATIONS

JP-2010136537-A, Oshida et al. , all pages (Year: 2010).*

(Continued)

*Primary Examiner* — Naishadh N Desai
(74) *Attorney, Agent, or Firm* — BUCHANAN, INGERSOLL & ROONEY PC

(57) ABSTRACT

A synchronous reluctance motor includes a shaft, a rotor, a stator, and multiple magnetic wedges. The stator radially opposes the rotor with a space therebetween. The stator includes a stator core having multiple slots arranged in the circumferential direction and open toward the rotor, and multiple stator coils disposed in the multiple slots. Multiple magnetic wedges close at least some of the multiple slots with the multiple stator coils disposed therein.

9 Claims, 7 Drawing Sheets

(56)                    References Cited

FOREIGN PATENT DOCUMENTS

JP          2002199675  A   *   7/2002
JP          2010136537  A   *   6/2010
WO          WO-0243223  A2  *   5/2002    ............ H02K 3/493

OTHER PUBLICATIONS

JP-2002199675-A, Ito, all pages (Year: 2002).*
WO-0243223-A2, Radovsky, all pages (Year: 2002).*
JP01034147, all pages (year 1989) (Year: 1989).*
JP-2002199675-A, all pages (Year: 2002).*
WO-0243223-A2, all pages (Year: 2002).*
International Search Report (PCT/ISA/210) with translation and
Written Opinion (PCT/ISA/237) mailed on May 25, 2021 by the
Japanese Patent Office as the International Searching Authority for
International Application No. PCT/JP2021/012387. (9 pages).
Notice of Reasons for Refusal dated Jul. 25, 2023, issued in the
corresponding Japanese Patent Application No. 2023-508288, 8
pages including 4 pages of English Translation.
Examination Report dated Feb. 27, 2026, issued in the correspond-
ing Indian Patent Application No. 202327058715. (8 pages).

* cited by examiner

2

SYNCHRONOUS RELUCTANCE MOTOR

TECHNICAL FIELD

The present disclosure relates to a synchronous reluctance motor.

BACKGROUND ART

Motors are used for various purposes, for example, for the purpose of generating a propulsive force of a railway vehicle. Motors installed in a railway vehicle are preferably highly efficient so that a small number of motors can generate a target propulsive force, because of the limited space under the floor of the railway vehicle. One example of the motors to be installed in an electric railway vehicle is synchronous motors having higher efficiency than induction motors. As one type of the synchronous motors, a typical synchronous reluctance motor is disclosed in Patent Literature 1.

The synchronous reluctance motor disclosed in Patent Literature 1 includes a rotor and a stator radially opposing the rotor with a space therebetween. The rotor is fabricated by stacking circular magnetic steel sheets having slits arranged in the circumferential direction, for example. Each of the slits has a curved shape convex toward the center of the circular shape. Since through holes are formed, the rotor has various magnetic resistances depending on positions in the circumferential direction. The rotor thus has multiple salient poles, which indicate portions each having a low magnetic resistance. The salient poles of the rotor are attracted to stator coils disposed in slots provided in the stator in response to energization of the stator coils, resulting in rotation of the rotor.

CITATION LIST

Patent Literature

Patent Literature 1: Unexamined Japanese Patent Application Publication No. 2002-199675

SUMMARY OF INVENTION

Technical Problem

Although a synchronous reluctance motor has higher efficiency than an induction motor, the efficiency of the synchronous reluctance motor needs to be further improved in order to generate the target propulsive force of the railway vehicle with a much smaller number of motors, for example. The efficiency of the synchronous reluctance motor can be improved by increasing the current flowing in the stator coils, increasing the number of the slots of the stator to narrow the circumferential intervals of the stator coils, or narrowing the space between the stator and the rotor, for example.

An excessively high current flowing in the stator coils unintentionally raises the temperature inside the synchronous reluctance motor. Thus, a cooling capacity of the synchronous reluctance motor needs to be improved. When the cooling capacity is improved by increasing the size of a fan, for example, the synchronous reluctance motor accordingly becomes larger. In contrast, narrowed circumferential intervals of the stator coils or a narrowed space between the stator and the rotor increases the variation of magnetic permeance of the stator, leading to an expansion of the amplitude of harmonic magnetic flux generated in the stator. Such an expansion of the amplitude causes increases in torque ripple, electromagnetic excitation force, and harmonic loss. These problems are not peculiar to synchronous reluctance motors installed in railway vehicles but common to general synchronous reluctance motors intended to have higher efficiencies.

An objective of the present disclosure, which has been accomplished in view of the above situations, is to provide a highly efficient synchronous reluctance motor that can suppress increases in coil current and in variation of magnetic permeance.

Solution to Problem

In order to achieve the above objective, a synchronous reluctance motor according to an aspect of the present disclosure includes a shaft, a rotor, a stator, and multiple magnetic wedges. The shaft is supported rotatably around the rotation axis. The rotor is located radially outward from the shaft and rotatable integrally with the shaft, and has a plurality of salient poles. The stator includes a stator core radially opposing the rotor with a space therebetween and including a plurality of slots arranged in the circumferential direction around the rotation axis and open toward the rotor, and a plurality of stator coils disposed in the plurality of slots. A plurality of magnetic wedges close at least some of the plurality of slots with the plurality of stator coils disposed therein.

Advantageous Effects of Invention

The synchronous reluctance motor according to an aspect of the present disclosure includes the magnetic wedges to close at least some of the slots provided in the stator while the stator coils are disposed in the slots. The magnetic wedges closing the slots can suppress an increase in variation of magnetic permeance of the stator even when the efficiency is improved by narrowing the circumferential intervals of the stator coils or narrowing the space between the stator and the rotor while maintaining the magnitude of the current flowing in the stator coils. This structure can provide a highly efficient synchronous reluctance motor that can suppress increases in coil current and in variation of magnetic permeance.

DESCRIPTION OF EMBODIMENTS

Figure 1:
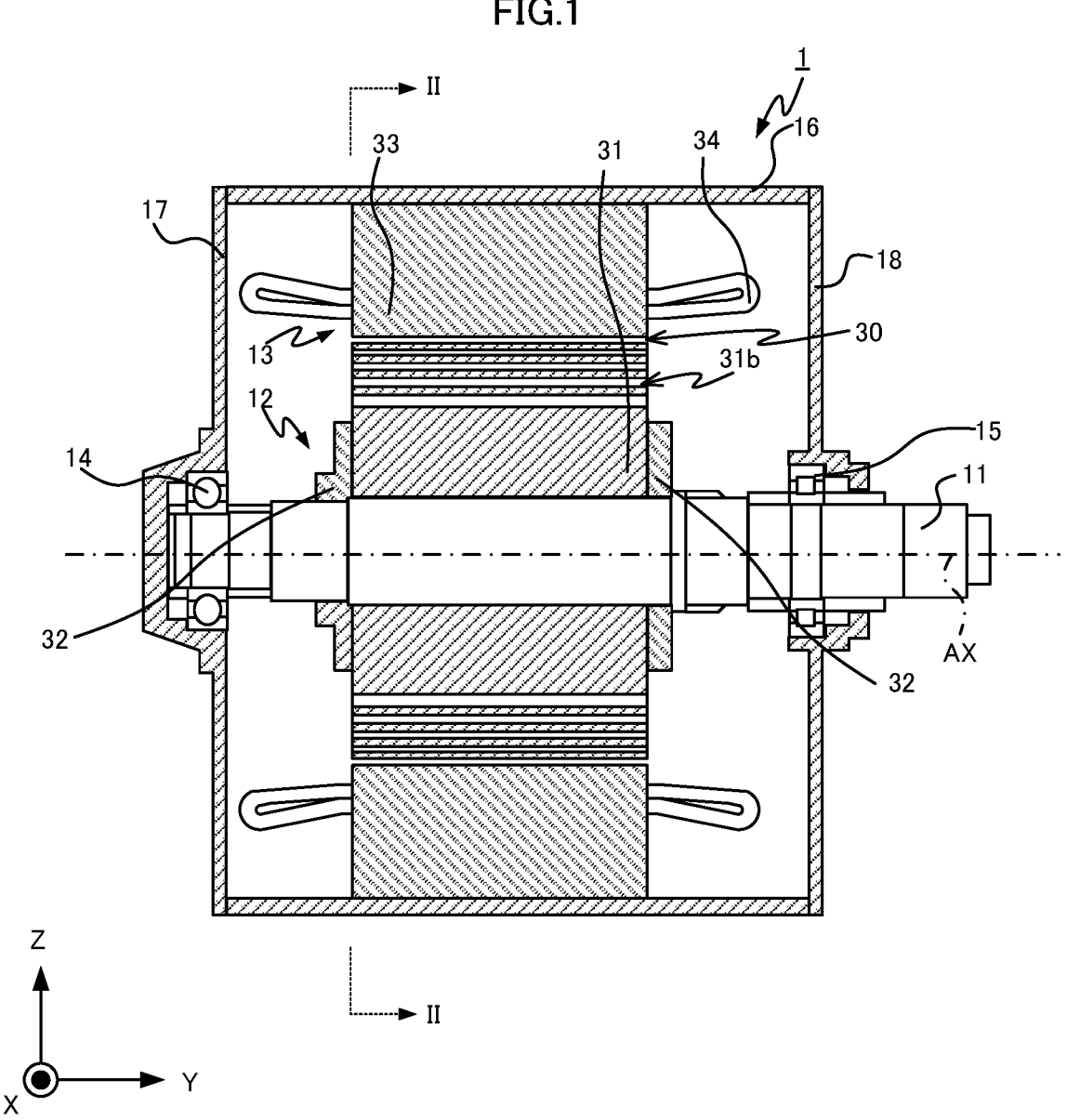
FIG. 1 is a sectional view of a synchronous reluctance motor according to Embodiment 1.

A synchronous reluctance motor according to embodiments of the present disclosure is described in detail below with reference to the accompanying drawings. In the drawings, the components identical or corresponding to each other are provided with the same reference symbol.

Embodiment 1

The following description is directed to a synchronous reluctance motor 1 according to Embodiment 1, which is a synchronous reluctance motor for driving a railway vehicle. The synchronous reluctance motor 1 illustrated in FIG. 1 is installed under the floor of the railway vehicle. In FIG. 1, the Z-axis direction indicates the vertical direction when the railway vehicle is in a horizontal state. The Y-axis direction indicates the width direction of the railway vehicle. The X-axis direction indicates the traveling direction of the railway vehicle. In other words, the railway vehicle travels toward the positive side in the X-axis direction or the negative side in the X-axis direction. The X, Y, and Z axes are orthogonal to each other.

Figure 2:
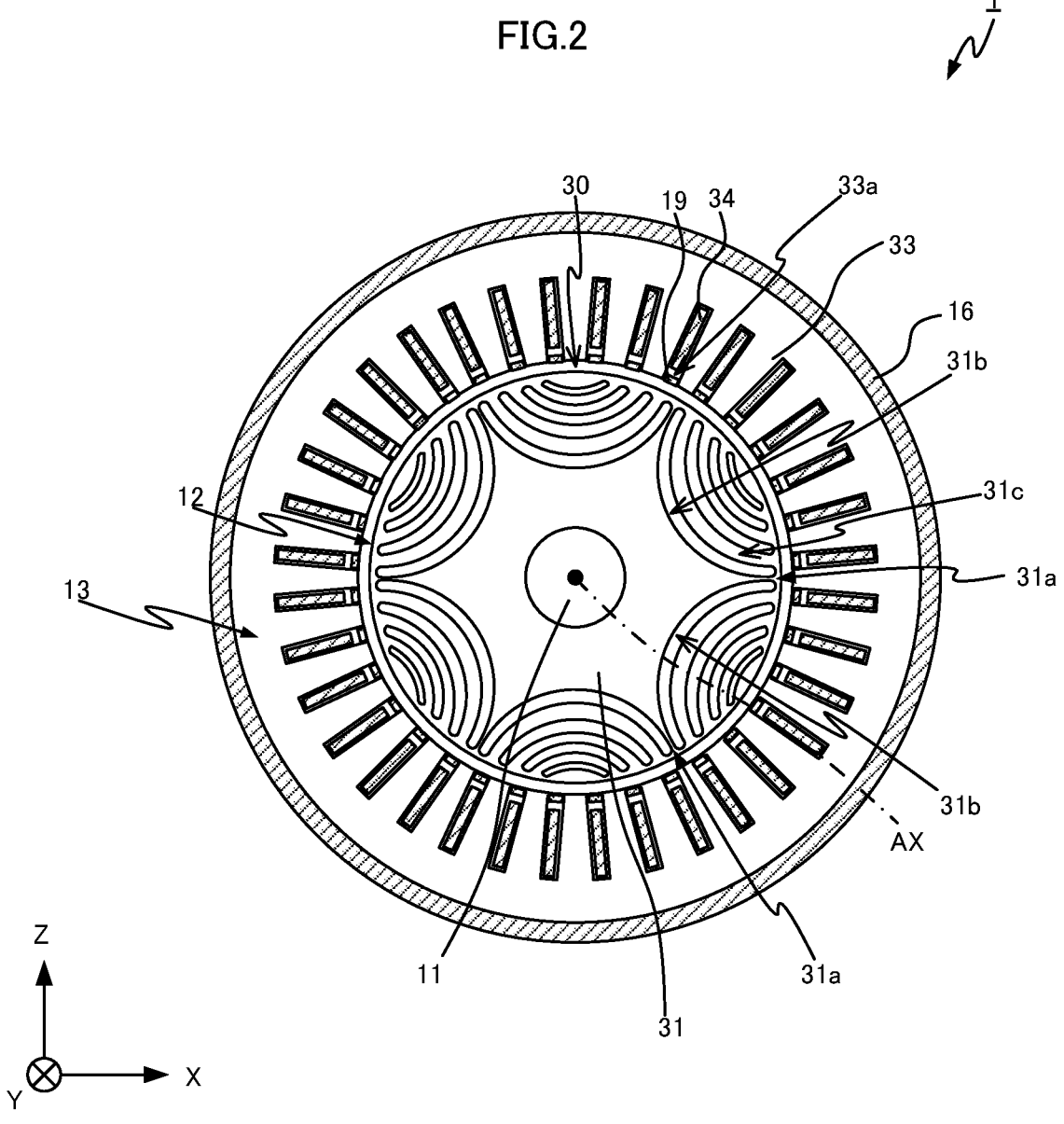
FIG. 2 is a sectional view of the synchronous reluctance motor according to Embodiment 1 taken along the line II-II of FIG. 1.

The synchronous reluctance motor 1 includes a shaft 11 supported rotatably around a rotation axis AX represented with the dashed and single-dotted line in FIG. 1, a rotor 12 located radially outward from the shaft 11 and rotatable integrally with the shaft 11, a stator 13 radially opposing the rotor 12 with a space 30 therebetween, and bearings 14 and 15 to support the shaft 11 rotatably. The synchronous reluctance motor 1 further includes a frame 16 to accommodate the rotor 12, the stator 13, and the bearings 14 and while the shaft 11 is inserted therethrough, and a first bracket 17 and a second bracket 18 to hold the frame 16 therebetween in the direction of extension of the rotation axis AX. As illustrated in FIG. 2, which is a sectional view taken along the line II-II of FIG. 1, the synchronous reluctance motor 1 further includes magnetic wedges 19 to close slots 33a provided in the stator 13.

The components of the synchronous reluctance motor 1 are described in detail below.

The end of the shaft 11 adjacent to the second bracket 18 illustrated in FIG. 1 is coupled to the axle of the railway vehicle via joints and gears, which are not illustrated. The rotation of the shaft 11 causes generation of a propulsive force of the railway vehicle.

The rotor 12 includes a rotor core 31 provided to the shaft 11, and a pair of holding members 32 to hold the rotor core 31 therebetween in the direction of extension of the rotation axis AX and thereby stabilize the rotor core 31. As illustrated in FIG. 2, the rotor core 31 has multiple salient poles 31a. The salient pole indicates a portion of the rotor core 31 having a lower magnetic resistance than the other portions and guiding the magnetic flux generated in response to energization of the stator 13 to the inside.

As illustrated in FIGS. 1 and 2, the rotor core 31 has multiple slits 31b arranged in the circumference direction in Embodiment 1. Each of the slits 31b extends through the rotor core 31 in the direction of extension of the rotation axis AX and has a curved shape convex toward the radial center. Specifically, six slits 31b are arranged in the circumferential direction around the rotation axis AX, and four slits 31b are radially arranged. A slit 31b located on a radially inner side has a circumferential length shorter than that of a slit 31b located on a radially outer side. The salient poles 31a are formed in the vicinity of the ends of the slits 31b from which the slits 31b extend radially inward, specifically, in the vicinity of the portions in which two slits 31b are adjacent to each other in the circumferential direction. In other words, the salient poles 31a are formed at positions located between two slits 31b adjacent to each other in the circumferential direction. The rotor 12 has six salient poles 31a because six slits 31b are arranged in the circumference direction. In other words, the number of poles of the rotor 12 is six. Since four slits 31b are radially arranged, the radial spaces between the slits 31b define magnetic paths 31c for connecting two adjacent salient poles 31a to each other.

The rotor core 31 is fabricated by stacking magnetic steel sheets having a disc shape, for example. Each of the magnetic steel sheets has multiple through holes corresponding to the slits 31b illustrated in FIG. 2 and a through hole to receive the shaft 11. In detail, the magnetic steel sheet has multiple through holes having a curved shape convex toward the center of the disc shape, and a circular through hole located at the center. In a stack of the magnetic steel sheets, the curved through holes of the magnetic steel sheets constitute the slits 31b.

The pair of holding members 32 illustrated in FIG. 1 are plate members having an annular section in a plane orthogonal to the direction of extension of the rotation axis AX. The pair of holding members 32 hold the rotor core 31 therebetween and thereby suppress the magnetic steel sheets of the rotor core 31 from being displaced from each other in the circumferential direction.

The stator 13 includes a stator core 33 provided to the inner periphery of the frame 16, and multiple stator coils 34 inserted in the respective slots 33a provided in the stator core 33. The stator core 33 radially opposes the rotor core 31 to define the space therebetween. As illustrated in FIG. 2, the stator core 33 has the slots 33a extending in the direction of extension of the rotation axis AX. The stator core 33 is fabricated by stacking magnetic steel sheets that have an annular shape and include notches corresponding to the slots 33a, for example.

The slots 33a are open toward the rotor 12. For example, the slots 33a are grooves extending through the stator core 33 in the direction of extension of the rotation axis AX, open radially inward, and having a rectangular section in a plane orthogonal to the rotation axis AX. In Embodiment 1, thirty-six slots 33a are provided at regular intervals in the circumferential direction. The slots 33a receive the respective stator coils 34.

The stator coils 34 disposed in the above-described slots 33a are fed with three-phase AC current from the outside via a lead wire, which is not illustrated.

At least some of the slots 33a are provided with the magnetic wedges 19 to close the slots 33a while the stator coils 34 are disposed in the slots 33a. The magnetic wedges 19 have an appropriate shape and are made of an appropriate material so that the magnetic wedges 19 can avoid an increase in variation of magnetic permeance while closing the slots 33a and thus preventing the stator coils 34 from falling off. For example, the magnetic wedges 19 are made of plates of a ferromagnetic material, specifically, iron plates, or plates of the same material as the magnetic steel sheets of the stator core 33. The magnetic wedges 19 preferably have an appropriate radial thickness so that the magnetic wedges 19 reduce the variation of magnetic permeance caused by the existence of the slots 33a, for example, a thickness of at least the half of the radial length of the space 30. Specifically, the radial thickness of the magnetic wedges 19 is preferably at least one millimeter and at most four millimeters. Preferably, the magnetic wedges 19 each have a curved shape convex radially outward, and the inner peripheries of the magnetic wedges 19 are located on the same curved surface as the inner periphery of the stator core 33.

In Embodiment 1, the openings of all the slots 33a are closed by the magnetic wedges 19. For example, the magnetic wedges 19 fit in the openings of the respective slots 33a. The structure in which the openings of the slots 33a are closed by the magnetic wedges 19 can reduce the variation of magnetic resistance of the inner periphery of the stator 13 in comparison to that in the structure in which the openings of the respective slots 33a are not closed. The above-described structure can thus reduce the variation of magnetic permeance of the stator 13. In addition, the magnetic wedges 19 fitting in the openings of the respective slots 33a can prevent the stator coils 34 disposed in the respective slots 33a from falling off.

In Embodiment 1, the magnetic wedges 19 have a shape of thin plate. The shape of the magnetic wedges 19 can be determined depending on the shape of the openings of the slots 33a, and the amplitude of harmonic magnetic flux generated in the stator 13 in the case of absence of the magnetic wedges 19. In detail, the magnetic wedges 19 may have a shape that can tightly fit in the openings of the slots 33a so as not to fall off from the openings of the slots 33a. For example, the magnetic wedges 19 may have a shape of thin plate of which the radially outer surface has a circumferential width equal to the circumferential width of the openings of the slots 33a. Furthermore, the magnetic wedges 19 may have a shape of thin plate having an appropriate radial thickness so that the magnetic wedges 19 can suppress an expansion of the amplitude of harmonic magnetic flux, in order to attenuate the torque ripple, electromagnetic excitation force, and harmonic loss, which can be generated by the amplitude of harmonic magnetic flux, to allowable levels.

The bearing 14 is retained at the first bracket 17 and supports the shaft 11 rotatably.

The bearing 15 is retained at the second bracket 18 and supports the shaft 11 rotatably.

The frame 16 is fixed under the floor of the railway vehicle with fixing members, which are not illustrated. The frame 16 has a hollow cylindrical shape. In Embodiment 1, the frame 16 has a hollow cylindrical shape having openings at both ends, which are closed by the first bracket 17 and the second bracket 18.

Figure 3:
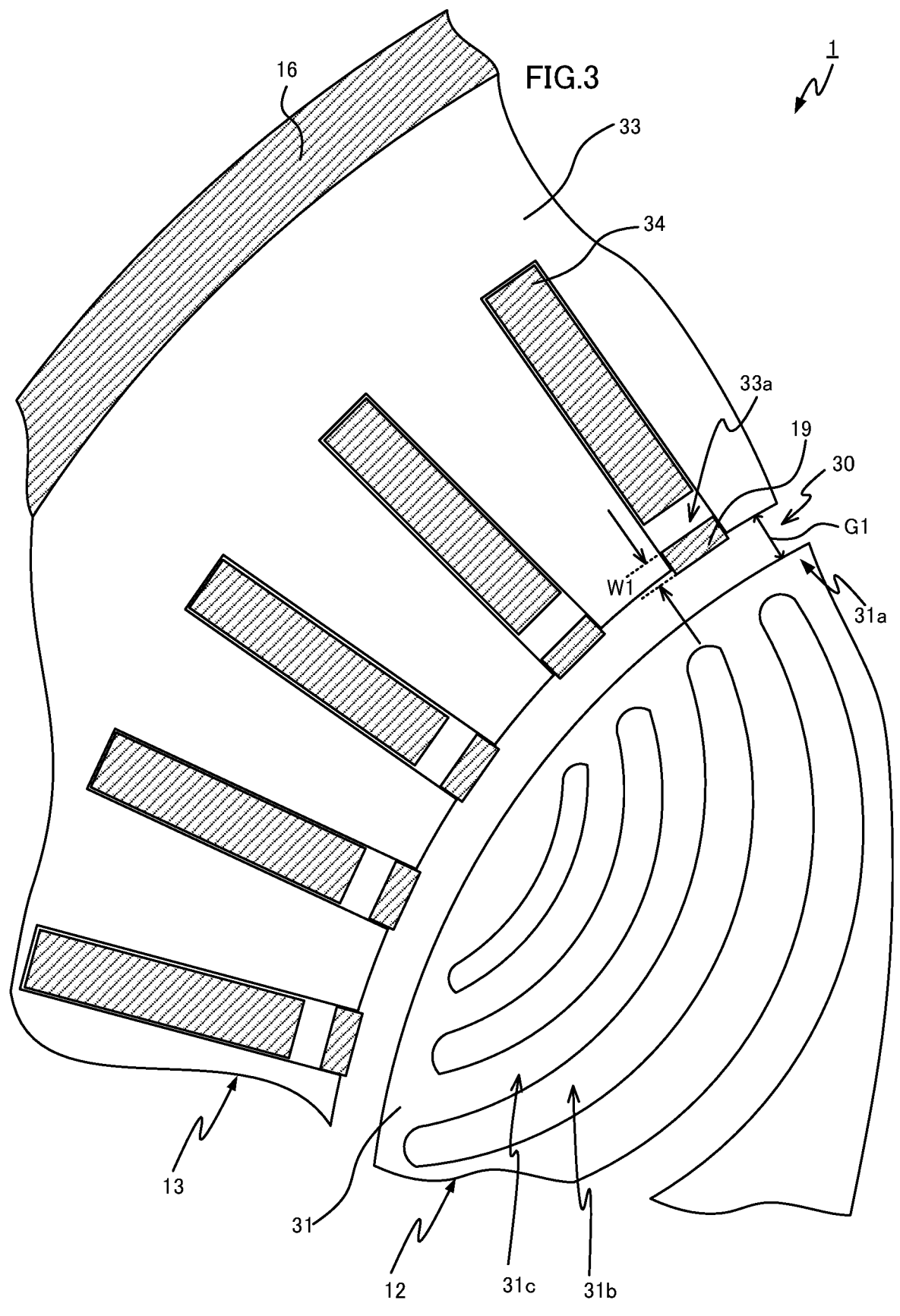
FIG. 3 is a partially enlarged view of the synchronous reluctance motor according to Embodiment 1.
Figure 4:
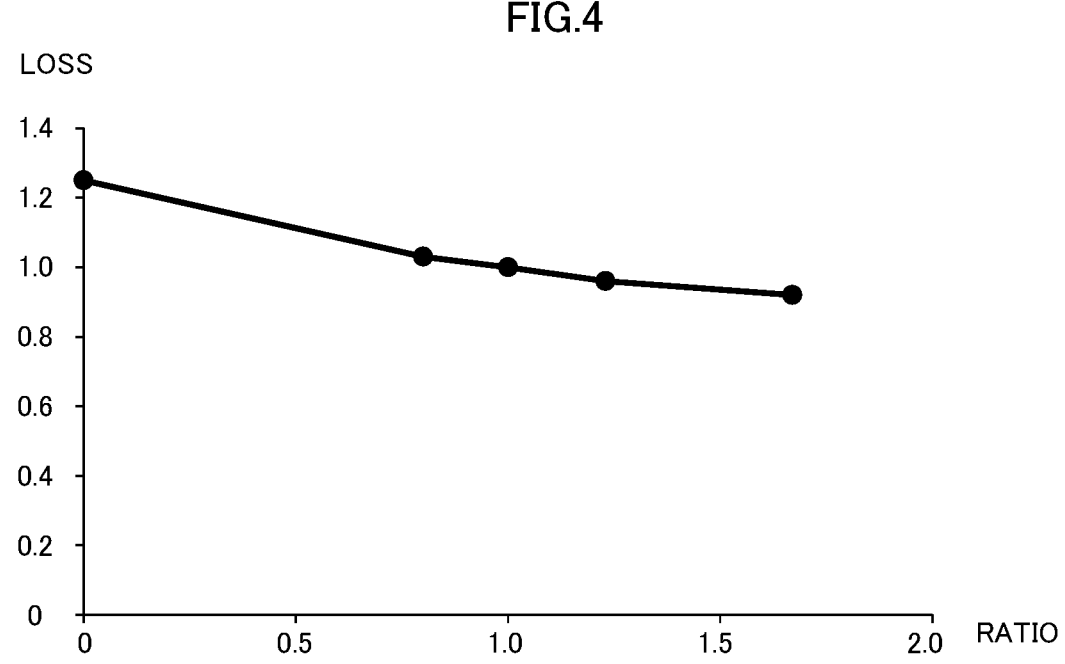
FIG. 4 illustrates an exemplary relationship between a thickness of magnetic wedges and a loss in a rotor according to Embodiment 1.

The following description is directed to a variation of loss in the rotor 12 depending on the shape of the magnetic wedges 19 in the synchronous reluctance motor 1 having the above-described structure. As illustrated in FIG. 3, which is a partially enlarged view of FIG. 2, W1 indicates the radial thickness of the magnetic wedges 19, and G1 indicates the radial length of the space 30. As illustrated in FIG. 4, the loss in the rotor 12 varies in accordance with a change in the ratio of the radial thickness W1 of the magnetic wedges 19 to the radial length G1 of the space 30.

The horizontal axis in FIG. 4 indicates a ratio of the radial thickness W1 of the magnetic wedges 19 to the radial length G1 of the space 30, that is, a value obtained by dividing the radial thickness W1 of the magnetic wedges 19 by the radial length G1 of the space 30. The horizontal value of 0 in FIG. 4 corresponds to a synchronous reluctance motor of which the slots of the stator are not closed by magnetic wedges. The horizontal value of 1 in FIG. 4 corresponds to a structure in which the radial length G1 of the space 30 is equal to the radial thickness W1 of the magnetic wedges 19.

The vertical axis in FIG. 4 indicates a loss in the rotor 12. In detail, the vertical axis in FIG. 4 indicates a level of loss in the rotor 12 when the loss in the rotor 12 is defined as 1 in the structure in which the radial length G1 of the space 30 is equal to the radial thickness W1 of the magnetic wedges 19. As illustrated in FIG. 4, the loss in the rotor 12 can be reduced by increasing the ratio of the radial thickness W1 of the magnetic wedges 19 to the radial length G1 of the space 30. A reduction in the loss in the rotor 12 leads to a reduction in the amount of heat generated from the rotor 12. This structure can thus suppress temperature rises in the bearings 14 and 15 that rotatably support the shaft 11 to which the rotor 12 is provided. In other words, the structure can increase the output from the synchronous reluctance motor 1 while maintaining the temperatures of the bearings 14 and 15 at an allowable temperature or lower.

As described above, the slots 33a provided in the stator core 33 of the stator 13 included in the synchronous reluctance motor 1 according to Embodiment 1 are closed by the magnetic wedges 19. The magnetic wedges 19 made of a ferromagnetic material close the openings of the slots 33a and can thereby reduce the variation of magnetic resistance of the inner periphery of the stator 13. This structure can thus reduce the variation of magnetic permeance of the stator 13, leading to decreases in torque ripple, electromagnetic excitation force, and harmonic loss.

In other words, since the synchronous reluctance motor 1 can reduce the variation of magnetic permeance by means of the magnetic wedges 19 closing the slots 33a of the stator core 33, the synchronous reluctance motor 1 can achieve a narrower space 30 between the rotor 12 and the stator 13 while maintaining the variation of magnetic permeance at the same level, in comparison to a synchronous reluctance motor in which the slots of the stator are not closed. For example, the space 30 has a radial length shorter than ten millimeters, specifically, a radial length of two millimeters. The space 30 between the rotor 12 and the stator 13 having a narrower width can facilitate rotation of the rotor 12 and improve the efficiency of the synchronous reluctance motor 1.

In addition, the synchronous reluctance motor 1 can achieve an increased number of slots 33a and narrower circumferential intervals of the stator coils 34, while maintaining the variation of magnetic permeance at the same level, in comparison to a synchronous reluctance motor in which the slots of the stator are not closed by magnetic wedges. The narrower circumferential intervals of the stator coils 34 can facilitate rotation of the rotor 12 and improve the efficiency of the synchronous reluctance motor 1.

The efficiency of the synchronous reluctance motor 1 can thus be improved by narrowing the space 30 between the rotor 12 and the stator 13 or narrowing the circumferential intervals of the stator coils 34, as described above, without increasing the current flowing in the stator coils 34. In other words, by means of the magnetic wedges 19 closing the slots 33a of the stator core 33, the highly efficient synchronous reluctance motor 1 can suppress an increase in the current flowing in the stator coils 34 and an increase in the variation of magnetic permeance.

Embodiment 2

Although the openings of all the slots 33a are closed by the magnetic wedges 19 in the synchronous reluctance motor 1 according to Embodiment 1, the number of the magnetic wedges 19 may be smaller than the number of the slots 33a. The description of Embodiment 2 is directed to a synchronous reluctance motor in which the number of the magnetic wedges 19 is smaller than the number of the slots 33a.

Figure 5:
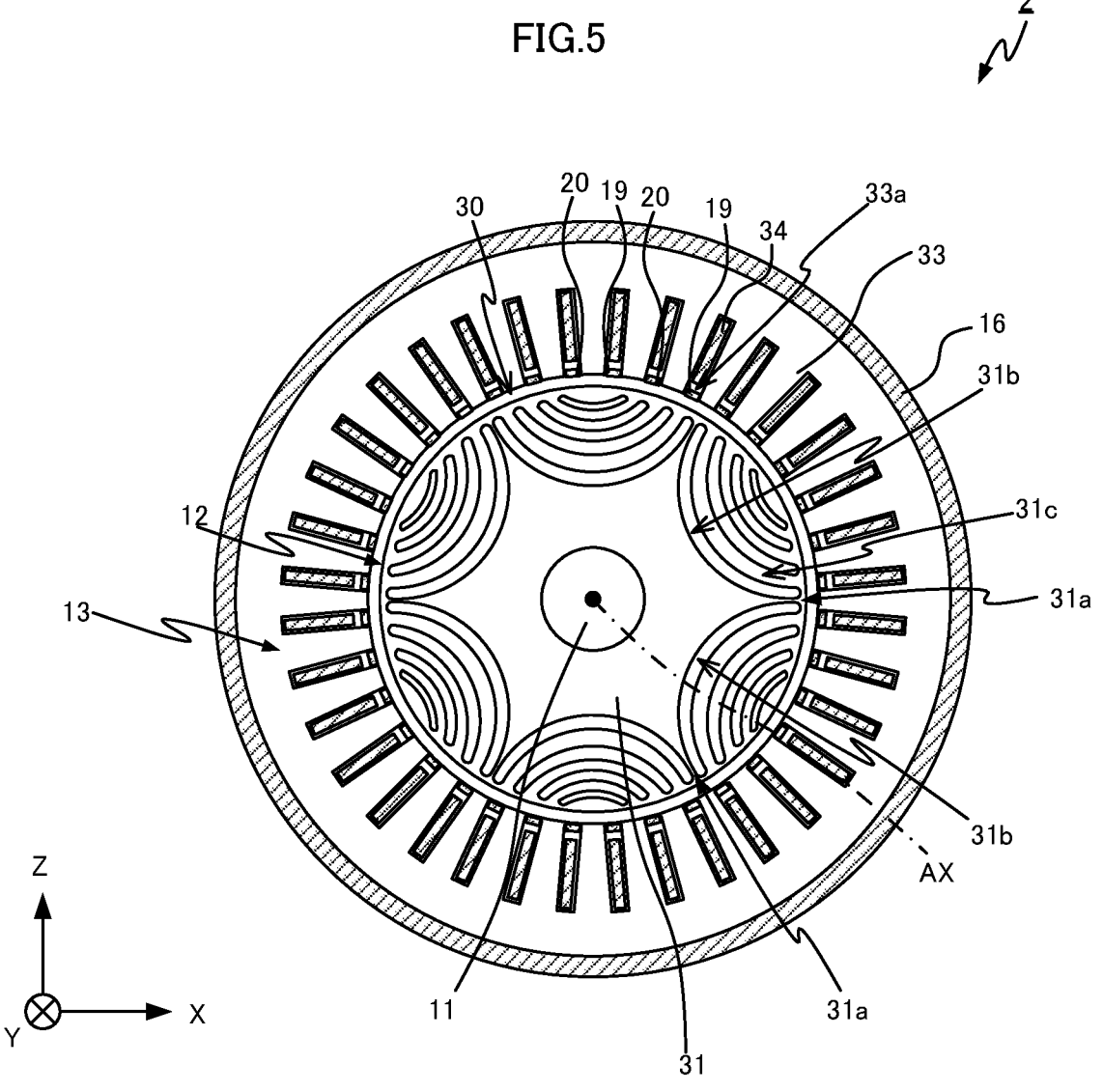
FIG. 5 is a sectional view of a synchronous reluctance motor according to Embodiment 2.

As illustrated in FIG. 5, a synchronous reluctance motor 2 according to Embodiment 2 further includes non-magnetic wedges 20 to close the slots 33a other than the slots 33a closed by the magnetic wedges 19, in addition to the components of the synchronous reluctance motor 1 according to Embodiment 1. FIG. 5 is a sectional view of the synchronous reluctance motor 2 in the same section as in FIG. 2. The non-magnetic wedges 20 are made of a non-magnetic material, specifically, a material of which the relative magnetic permeability can be regarded as 1, for example, aluminum. The non-magnetic wedges 20 preferably have the same shape as the magnetic wedges 19.

The number of the magnetic wedges 19 included in the synchronous reluctance motor 2 is smaller than the number of the slots 33a, and is equal to a multiple of the product of the number of poles of the rotor 12 and the number of phases of the stator 13. In detail, the ratio of the number of the magnetic wedges 19 to the number of the slots 33a can be represented by k/n, where n indicates the number of slots per phase per pole obtained by dividing the number of the slots 33a by the product of the number of poles of the rotor 12 and the number of phases of the stator 13. The coefficient k is a natural number equal to or smaller than n. In Embodiment 2, since the number of poles of the rotor 12 is six and the number of the slots 33a is 36, the number of slots per phase per pole n is equal to 2 in the case where three-phase AC current is fed to the stator coils 34. In Embodiment 2, the coefficient k is defined as 1. As illustrated in FIG. 5, the magnetic wedges 19 and the non-magnetic wedges 20 are preferably arranged alternately in the circumferential direction.

As described above, some of the slots 33a are closed by the magnetic wedges 19, and the others of the slots 33a are closed by the non-magnetic wedges 20 in the synchronous reluctance motor 2. By means of the magnetic wedges 19 closing the slots 33a of the stator core 33, the highly efficient synchronous reluctance motor 2 can suppress an increase in the current flowing in the stator coils 34 and an increase in the variation of magnetic permeance. Such a combination of the magnetic wedges 19 and the non-magnetic wedges 20 less expensive than the magnetic wedges 19 can reduce the manufacturing costs of the synchronous reluctance motor 2.

Figure 6:
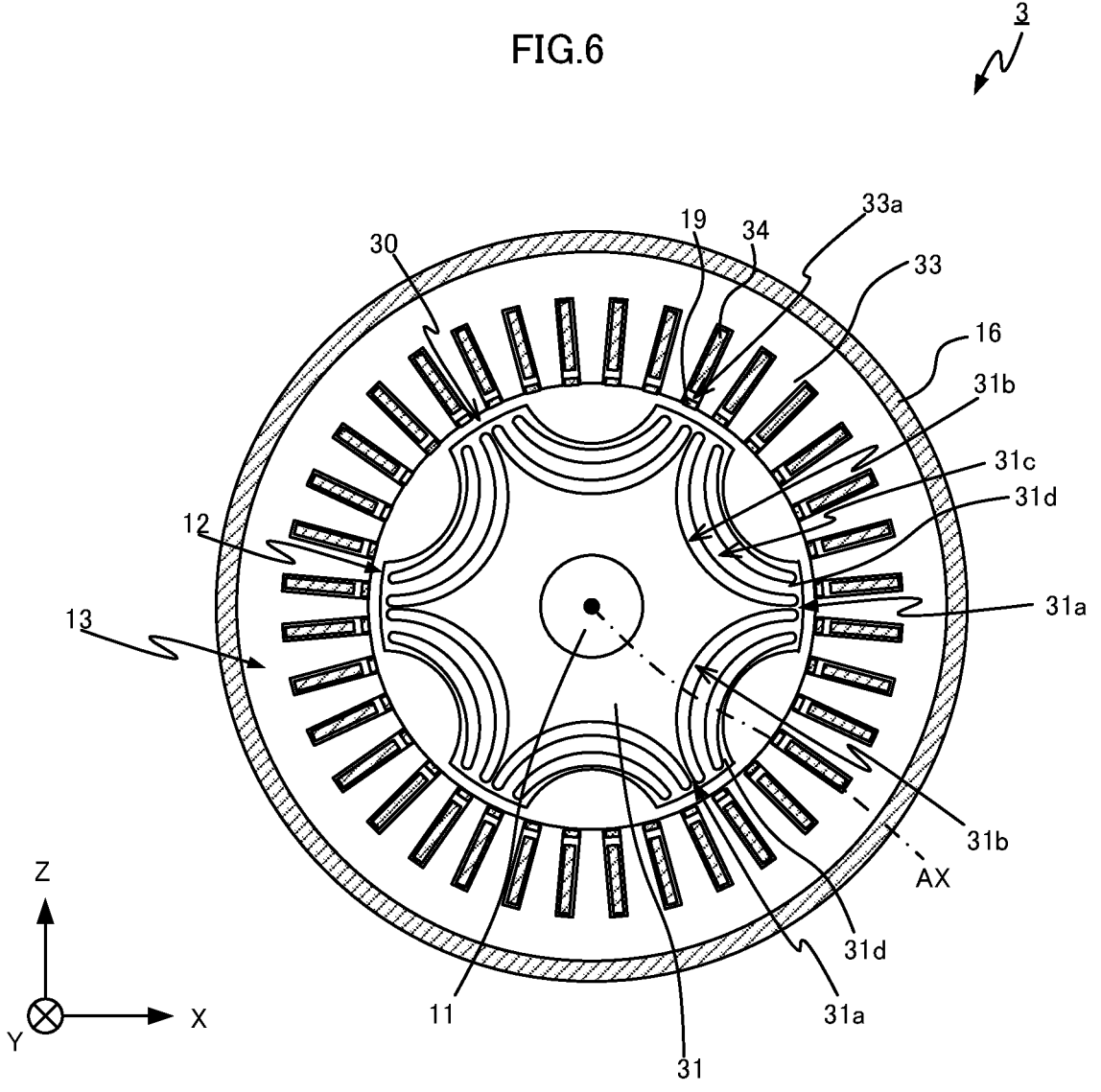
FIG. 6 is a sectional view of a modified synchronous reluctance motor according to the embodiments.

The above-described embodiments are not intended to limit the scope of the present disclosure. The rotor core 31 has any shape provided that the rotor 12 can achieve multiple salient poles 31a. For example, the rotor core 31 does not necessarily have an annular section in a plane orthogonal to the direction of extension of the rotation axis AX. Specifically, as in a synchronous reluctance motor 3 illustrated in FIG. 6, the rotor core 31 may have multiple protrusions 31d that are arranged in the circumferential direction on the outer peripheral surface and protruding radially outward. The salient poles 31a are formed at the protrusions 31d. The rotor core 31 of the rotor 12 included in the synchronous reluctance motor 3 is fabricated by preparing multiple through holes in magnetic steel sheets having circular disc shapes such that each of the through holes has a curved shape convex toward the center of the disc shape, preparing notches at the outer edges of the disc shapes such that each of the notches has a curved shape convex toward the center of the disc shape, and then stacking the magnetic steel sheets on each other, for example.

The rotor core 31 of the rotor 12 included in the synchronous reluctance motor 3 may have the protrusions 31d alone without the slits 31b. In this case, the protrusions 31d can also define the salient poles 31a of the rotor 12.

The above-mentioned number of poles of the rotor 12 is a mere example. The number of poles is not necessarily six and may be any even number. For example, the rotor core 31 may include four slits 31b in the circumferential direction and four slits 31b in the radial direction. The number of poles of the rotor 12 is four in this case.

In a case where the number of poles of the rotor 12 is four, the number of the slots 33a is 36, and three-phase AC current is fed to the stator coils 34, the number of slots per phase per pole n is three. The ratio of the number of the magnetic wedges 19 to the number of the slots 33a is not necessarily 1 or ½ as in the above-described embodiments. For example, the ratio of the number of the magnetic wedges 19 to the number of the slots 33a may also be ⅓. In other words, k=1 may be applied to the expression k/n, which represents the ratio of the number of the magnetic wedges 19 to the number of the slots 33a. In this case, twelve magnetic wedges 19, corresponding to the one-third of 36, are disposed at regular intervals in the circumferential direction. Specifically, one magnetic wedge 19 and a unit of two adjacent non-magnetic wedges 20 are arranged alternately in the circumferential direction.

The ratio of the number of the magnetic wedges 19 to the number of the slots 33a in the synchronous reluctance motor 2 may also be ⅔. In this case, twenty-four magnetic wedges 19, corresponding to the two-thirds of 36, are disposed such that two adjacent magnetic wedges 19 are arranged at regular intervals in the circumferential direction. Specifically, a unit of two adjacent magnetic wedges 19 and one non-magnetic wedge 20 are disposed alternately in the circumferential direction.

Figure 7:
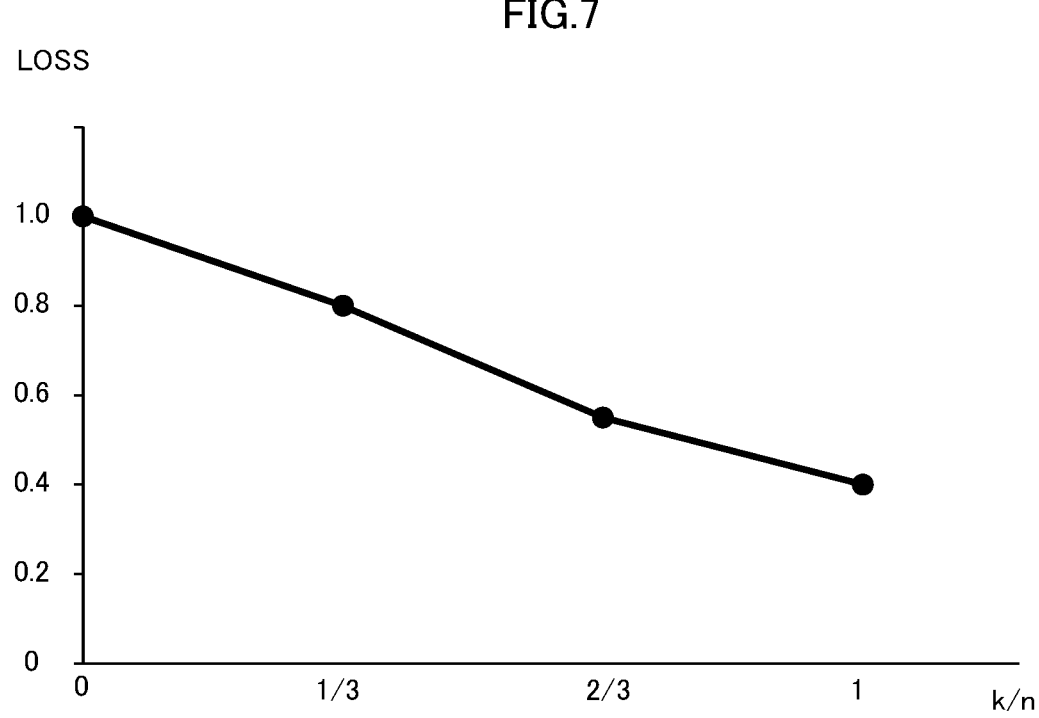
FIG. 7 illustrates an exemplary relationship between a loss and a ratio of the number of magnetic wedges to the number of slots in a synchronous reluctance motor according to the embodiments.

FIG. 7 illustrates a variation of loss in the synchronous reluctance motor 1 or 2 in accordance with a change in the ratio of the number of the magnetic wedges 19 to the number of the slots 33a in the case where the number of slots per phase per pole n is three. The horizontal axis in FIG. 7 indicates a ratio (k/n) of the number of the magnetic wedges 19 to the number of the slots 33a. The horizontal value of 0 in FIG. 7 corresponds to a synchronous reluctance motor in which the slots of the stator are not closed by magnetic wedges. The horizontal value larger than 0 and smaller than 1 in FIG. 7 corresponds to the synchronous reluctance motor 2 including the magnetic wedges 19 to close some of the slots 33a. The horizontal value of 1 in FIG. 7 corresponds to the synchronous reluctance motor 1 including the magnetic wedges 19 to close all the slots 33a.

The vertical axis in FIG. 7 indicates a loss in the synchronous reluctance motor 1 or 2. In detail, the vertical axis in FIG. 7 indicates a level of loss in the synchronous reluctance motor 1 or 2 when the loss in a synchronous reluctance motor in which the slots of the stator are not closed by magnetic wedges is defined as 1. As illustrated in FIG. 7, the synchronous reluctance motor including the magnetic wedges 19 to close only some of the slots 33a can also reduce the loss, in comparison to a synchronous reluctance motor in which the slots of the stator are not closed by magnetic wedges.

The above-mentioned number of phases of the stator 13 is a mere example. The stator coils 34 may also be fed with two-phase AC current, for example.

The above-mentioned shape of the slits 31b is a mere example. The slits 31b may have any shape provided that the slits 31b enable the rotor 12 to have the salient poles 31a.

The above-mentioned number of the slots 33a is a mere example and may be any even number. For example, the number of slots may be 54.

The above-mentioned shape of the slots 33*a* is a mere example. The slots 33*a* may have any shape provided that the slots 33*a* can receive the stator coils 34. For example, the slots 33*a* may have a shape of which the circumferential width decreases toward the radial center.

The synchronous reluctance motors 1 to 3 can be applied as not only motors for generating propulsive forces of railway vehicles, but also general-purpose motors, such as motors for driving pumps, for example.

The synchronous reluctance motors 1 to 3 can be applied as not only motors of an inner-rotor type but also motors of an outer-rotor type.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

1, 2, 3 Synchronous reluctance motor
11 Shaft
12 Rotor
13 Stator
14, 15 Bearing
16 Frame
17 First bracket
18 Second bracket
19 Magnetic wedge
20 Non-magnetic wedge
30 Space
31 Rotor core
31*a* Salient pole
31*b* Slit
31*c* Magnetic path
31*d* Protrusion
32 Holding member
33 Stator core
33*a* Slot
34 Stator coil
AX Rotation axis

The invention claimed is:

1. A synchronous reluctance motor comprising:
a shaft supported rotatably around a rotation axis;
a rotor located radially outward from the shaft and rotatable integrally with the shaft, the rotor including a plurality of salient poles;
a stator including
  a stator core radially opposing the rotor with a space therebetween, the stator core including a plurality of slots arranged in a circumferential direction around the rotation axis, the plurality of slots being open toward the rotor, and
  a plurality of stator coils disposed in the plurality of slots; and
a plurality of magnetic wedges to close at least some of the plurality of slots with the plurality of stator coils disposed therein, wherein
a number of the plurality of magnetic wedges is equal to a multiple of a product of a number of poles of the rotor and a number of phases of the stator, and is smaller than a number of the plurality of slots,
a radial thickness of the plurality of magnetic wedges is larger than a radial length of the space between the stator and the rotor, and
the plurality of magnetic wedges are disposed at regular intervals in the circumferential direction.

2. The synchronous reluctance motor according to claim 1, wherein units of the plurality of magnetic wedges are disposed at regular intervals in the circumferential direction, each of the units including two or more magnetic wedges adjacent to each other.

3. The synchronous reluctance motor according to claim 1, further comprising a non-magnetic wedge to close a slot of the plurality of slots other than the at least some slots closed by the magnetic wedges while the plurality of stator coils are disposed in the plurality of slots.

4. The synchronous reluctance motor according to claim 1, wherein
the rotor includes a plurality of slits arranged in the circumferential direction, each of the plurality of slits extending through the rotor in an extending direction of the rotation axis and having a curved shape convex toward a radial center, and
the plurality of salient poles are formed at positions located between slits adjacent to each other in the circumferential direction.

5. The synchronous reluctance motor according to claim 2, wherein
the rotor includes a plurality of slits arranged in the circumferential direction, each of the plurality of slits extending through the rotor in an extending direction of the rotation axis and having a curved shape convex toward a radial center, and
the plurality of salient poles are formed at positions located between slits adjacent to each other in the circumferential direction.

6. The synchronous reluctance motor according to claim 3, wherein
the rotor includes a plurality of slits arranged in the circumferential direction, each of the plurality of slits extending through the rotor in an extending direction of the rotation axis and having a curved shape convex toward a radial center, and
the plurality of salient poles are formed at positions located between slits adjacent to each other in the circumferential direction.

7. The synchronous reluctance motor according to claim 1, wherein
the rotor includes a plurality of protrusions arranged in the circumferential direction on an outer peripheral surface, each of the plurality of protrusions protruding radially outward, and
the plurality of salient poles are formed at the plurality of protrusions.

8. The synchronous reluctance motor according to claim 5, wherein
the rotor includes a plurality of protrusions arranged in the circumferential direction on an outer peripheral surface, each of the plurality of protrusions protruding radially outward, and
the plurality of salient poles are formed at the plurality of protrusions.

9. The synchronous reluctance motor according to claim 3, wherein the rotor includes a plurality of protrusions arranged in the circumferential direction on an outer peripheral surface, each of the plurality of protrusions protruding radially outward, and the plurality of salient poles are formed at the plurality of  5 protrusions.

* * * * *